Inventor
Fukuo Shibata

Jan. 25, 1966  FUKUO SHIBATA  3,231,805
SPEED CONTROL SYSTEM OF INDUCTION MOTOR
Filed Feb. 2, 1962  3 Sheets-Sheet 2

INVENTOR
Fukuo Shibata

United States Patent Office 3,231,805
Patented Jan. 25, 1966

3,231,805
SPEED CONTROL SYSTEM OF INDUCTION MOTOR
Fukuo Shibata, 13 Tokiwa-cho, Nishinomiya, Hyogo Prefecture, Japan
Filed Feb. 2, 1962, Ser. No. 171,335
Claims priority, application Japan, Nov. 24, 1959, 34/36,835
9 Claims. (Cl. 318—238)

This application is a continuation-in-part of application Serial No. 45,245 filed July 25, 1960, and now abandoned.

My invention relates to improvements in electric control systems for wide range speed control for wound rotor type induction motors in which electric energy is taken from the output terminals of the secondary windings of the induction motors, and this electric energy is converted into another form of electric energy through auxiliary direct current machines coupled mechanically to other alternating current machines and semiconductor rectifiers, and the objects of my invention are, first to make it possible to control the speed of these sets over a wide range with smaller auxiliary machines and/or apparatus than those of prior methods, whilst keeping high efficiency of these sets; second, to make it possible to control the speed of these sets with the safe commutation of the auxiliary machines, and therefore third, to reduce the total cost and space occupied by these sets and to increase the reliability of these sets compared with known arrangements.

Heretofore, various arrangements have been devised which permit the control of induction motors by employing auxiliary direct current machines and rectifiers which are electrically connected with the rotor or secondary windings of the induction motors. Some of these arrangements have obtained the desired speed control, but the speed control has been obtained by the use of electric discharge valves having control members such as grids which control the conductivities of the valves. As these electric valve means necessitate the use of control elements such as grids in valves, phase shifters, batteries for impressing negative biasing on grids and so forth, these arrangements become complicated, expensive and further unreliable because of its many elements which are liable to get into trouble. Therefore, it becomes important in the commercial application of simple type rectifiers—that is diode type rectifiers having no grid to the control of induction motors to provide control systems which include auxiliary machines and apparatus of proportionatte size and rating, and by which the induction motors can be controlled in the wide range of the speed.

I attain these above objects by methods illustrated in the accompanying drawings, in which.

Figure 1:
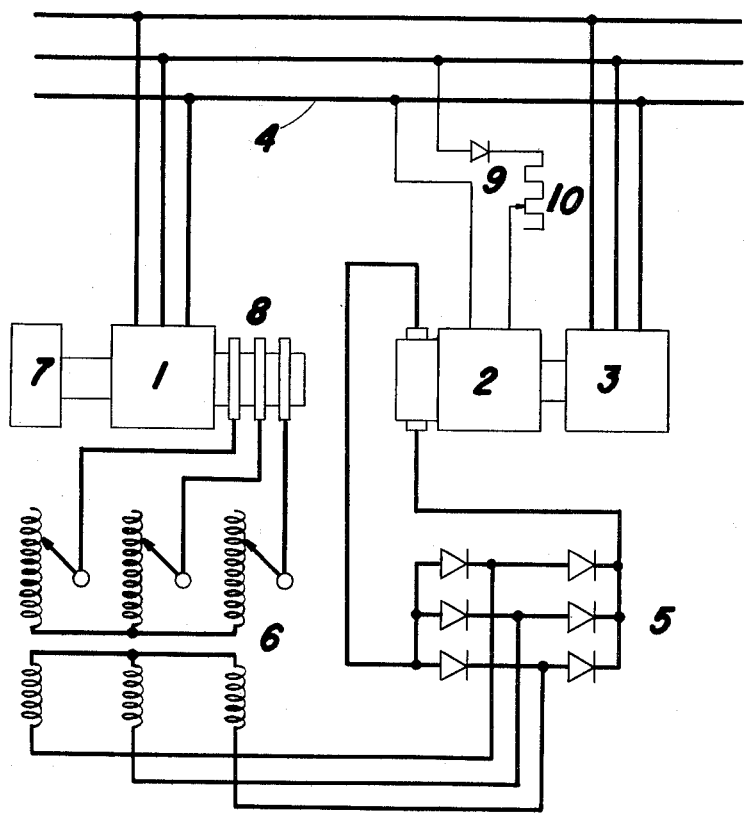
FIG. 1 illustrates diagrammatcially one embodiment of my invention.

FIG. 1 is one of the examples of the electric circuits in accordance with the method of my invention of speed control for a wound rotor type induction motor in which the electric energy taken from the output terminals 8 of the secondary windings of the main induction motor 1 is converted into another form of electric energy through an induction generator or a synchronous generator 3 driven by an auxiliary direct current machine 2 and semiconductor rectifiers 5. In FIG. 1, a variable voltage ratio transformer 6 is connected to the output terminals 8 of the secondary windings of the wound rotor type induction motor 1. The variable voltage ratio transformer includes not only a transformer having many winding taps, but also an induction regulator or an autotransformer. In FIG. 1, 4 is an alternating current source for the main induction motor 1, which has a mechanical load 7. The field of the auxiliary direct current machine 2 is excited by the alternating current source 4, through rectifier 9 and rheostat 10.

As it is shown in FIG. 1, one of the special features of my invention is to insert a variable voltage ratio transformer in the output circuit of the secondary windings of the wound rotor type induction motor, and to make the electric current flowing from the main induction motor to the auxiliary direct current motor pass through this transformer. In this case, the capacity of the transformer inserted in the intermediate outlet of the output terminals can be kept small for the reason described later. Generally, the cost of the transformer is very cheap compared with that of the rotary machine having the same capacity. In the circuit in accordance with my invention, the capacities of the auxiliary direct current machine and rectifiers can be reduced as explained later.

I will explain the operation of my invention applied to the circuit of FIG. 1 as an example. Reference is made to the circuit in which the output terminals of the secondary windings are electrically connected to the auxiliary direct current machine only through the rectifiers, not through the variable voltage ratio transformer. First of all, the condition in which the output terminals 8 of the secondary windings of the main induction motor are short circuited in FIG. 1 is considered, that is, in the condition in which the induced voltage on the terminals of the direct current machine 2 is zero volts. In that condition, the induction motor 1 is running with a slight slip. At that time, electric power is not supplied to the auxiliary direct current machine 2 from the secondary windings of the induction motor 1, and the auxiliary direct current machine 2 is driven by another synchronous generator or induction generator 3. In this case, the synchronous or induction generator 3 acts as a synchronous or induction motor by receiving electric power from the alternating current source 4, and the auxiliary direct current machine 2 is driven in no load condition by the generator 3.

The electric power is supplied from the alternating current source 4 to the synchronous or induction generator 3, by which the motor-generator 3–4 can be driven in no load condition, and as the field excitation of the auxiliary direct current machine 2 is zero, no electric power enters into the direct current machine 2 from the induction motor 1.

If the field excitation or the terminal voltage of the auxiliary direct current machine 2 is gradually increased from zero to the larger value and up to the maximum, the direct current machine 2 receives electric power from the induction motor 1, and the synchronous or induction generator 3 is driven by the direct current machine 2. In this state, electric power is fed to the alternating current source line 4 from the synchronous or induction generator 3 driven by the direct current machine 2.

In short, the direct current machine 2 acts as a generator or a motor, and the induction motor induces the voltage to overcome the terminal voltage of the direct current machine 2 on the output terminals of the secondary windings and makes the current flow in the secondary circuit.

If we neglect various losses, we can write the fundamental equation of the induction motor, as follows:

$$P_1 = P_2 + P_3 \quad (1)$$

where $P_1$ = input power into primary circuit
$P_2$ = electric output power taken out of terminals of secondary windings
$P_3$ = mechanical output power supplied from rotor shaft to load.

And then $$P_1 : P_2 : P_3 = 1 : S : (1-S) \quad (2)$$

where $S$ = slip of induction motor. For instance, if the slip is 20%, the electric power which the auxiliary direct current machine must receive from the secondary windings of the main induction motor as $P_2$ is also 20% of the input power of the main induction motor, and the mechanical output of the main induction motor is 80% of its input power. These calculations are made by neglecting all losses in this system.

Accordingly, if we want to control the speed from 100% to 80% and the output power required by the load at 80% of the rated speed is 80% of the rated capacity of the main induction motor, the capacities of the auxiliary direct current machine and its apparatus must be 20% of the rated capacity of the main induction motor. At that time, if the maximum limit of the voltage that we can adjust in the auxiliary direct current machine is 100 v., and if the load of the main induction motor is 80 kw. at 80% of the rated speed, the capacity and the current required of the auxiliary direct current machine are respectively 20 kw. and 200 A. If we want to control the speed of the main induction motor more widely, namely by more than 20%, we must apply the counter electromotive force of higher than 100 v. on the output terminals of the secondary windings of the main induction motor. But, as the voltage limit of the auxiliary direct current machine is 100 v., it cannot be excited by more than 100 v. Therefore, in such a condition, we cannot control the speed of the main induction motor more widely than 20%. Nevertheless, there may be an important question why we control the speed widely by providing the auxiliary direct current machine which has a higher voltage than 100 v. It is possible to control the speed widely, only by raising the voltage of the small capacity of the auxiliary direct current machine without the variable voltage ratio transformer, if the required torque-speed characteristic of this system is small value in the range of the low speed.

But, we cannot practically make such a control. Because, the slip point at which the maximum counter electromotive force on the output terminals of the secondary windings is required is quite different from the slip point at which the maximum current is required in the secondary windings of the main induction motor. For instance, the slip point at which the maximum counter electromotive force is required is nearly 100% slip, that is at standstill of the induction motor. On the contrary, the slip point at which the maximum current flows in the secondary windings of the main induction motor or in the auxiliary direct current machine is on the point of the minimum slip of the main induction motor, because the torque of the main induction motor is required to be the maximum when it is running at its rated slip, and the current of this secondary circuit must flow through the auxiliary direct current machine. Therefore, to control the speed of the main induction motor over the range 0–100% only by the auxiliary direct current machine without the transformer, the capacities of the auxiliary direct current machine and the rectifiers must be very large.

Now, let us consider the circuit of FIG. 1 including the variable voltage ratio transformer 6. If the variable voltage ratio transformer 6 is inserted in the secondary circuit of the main induction motor, we can enlarge the speed control range by raising the counter electromotive force on the secondary output terminals with the variable voltage ratio transformer. In other words, even if the voltage of the auxiliary direct current machine is kept constant, the counter electromotive force on the secondary output terminals can be changed by controlling the transforming ratio of the variable voltage ratio transformer 6. It is very easy to control the speed in the range of 0–100% with small capacities of the auxiliary direct current machine and rectifiers, if the variable voltage ratio transformer 6 is inserted in the output circuit of the secondary windings of the main induction motor.

Here, we must consider the capacity of the transformer.

Generally speaking, the size of the transformer becomes a large one, when the current of the transformer is a low frequency. But, the transformer 6 of FIG. 1 inserted in the secondary circuit of the induction motor does not become so large by the reason described below.

We can write the fundamental equation for a general transformer capacity as follows.

$$m \cdot E \cdot I = K \cdot m \cdot T \cdot \phi \cdot f \cdot I = K \cdot m \cdot AT \cdot \phi \cdot f \quad (3)$$

where $m$ = number of phases of transformer
$E$ = voltage of one phase
$I$ = phase current
$T$ = number of turns per phase of transformer
$f$ = frequency of current
$\phi$ = flux which flows in transformer
$K$ = constant
$AT$ = number of ampere turns When we assume the condition in which the main induction motor is running at a slip $S$, the voltage applied to the primary terminals of the transformer is $S \cdot E_2$, where $E_2$ is the voltage induced in the secondary windings of the still condition of the main induction motor, and on the other hand, the frequency of the current in the transformer is $S \cdot f_1$, where $f_1$ is the frequency of the current flowing in the primary circuit of the main induction motor.

So the Equation 3 becomes $$S \cdot E_2 \cdot I = K \cdot AT \cdot \phi \cdot S \cdot f_1$$

then $$AT \cdot \phi = \frac{E_2 \cdot I}{K \cdot f_1} \quad (4)$$

If the secondary circuit current of the main induction motor is $I_2$, the Equation 4 becomes $$AT \cdot \phi = \frac{E_2 \cdot I_2}{K \cdot f_1} \quad (5)$$

If we assume that the transformer is inserted in the primary circuit, the capacity of the transformer will be $$AT_1 \cdot \phi = \frac{E_1 \cdot I_1}{K \cdot f_1} \quad (6)$$

where $AT_1$ = number of ampere turns of transformer inserted in primary circuit of main induction motor
$\phi_1$ = flux which flows in transformer inserted in primary circuit of main induction motor
$E_1$ = primary input voltage of one phase of the main induction motor $I_1$=primary phase current of the main induction motor.

Comparing the Equation 5 with the Equation 6, we can get $$AT \cdot \phi = E_2 \cdot I_2 < E_1 \cdot I_1 = AT_1 \cdot \phi_1 \qquad (7)$$

Because, the main induction motor is excited from the primary circuit. Therefore, the Equation 7 will lead to the conclusion that the capacity of the variable voltage ratio transformer 6 in FIG. 1 is not large.

Though I have above explained the fundamental theory of my invention, the most important thing of this method thinking from the point of view of the practical use is that the capacities of the auxiliary direct current machine and rectifiers of this system are very small. As has been previously mentioned, if we use the original Scherbius circuit in which the variable voltage ratio transformer in FIG. 1 is removed, in the speed control of the range 0–100% of the speed rating, the capacities of the auxiliary direct current machine and the rectifiers must be equal to the capacity of the main induction motor. On the contrary, if we adopt the circuit of FIG. 1, only the capacity equal to ⅐ of the main induction motor rating is enough for the auxiliary direct current machine and rectifiers when the required characteristic is such that the load torque is proportional to square of the number of revolutions per minute of the machine, which can be for instance applied to the propulsion motor of the vessel.

I will roughly calculate the required capacity of the auxiliary direct current machine in such case, so that it may be understood easily. In this calculation, I neglect all the losses of the machine. From the Equation 2, we can get $$P_3 = \frac{1-S}{S} \cdot P_2 \geq C(1-S)^3 \qquad (8)$$

where C is a constant. Therefore $$P_2 \geq C \cdot S \cdot (1-S)^2 \qquad (9)$$

Let us calculate the maximum value of the right term of the Equation 9. It can be found that the maximum value of the right term of (9) is obtained at the point of $S = \frac{1}{3}$.

Substituting $S = \frac{1}{3}$ in the Equation 9 gives $$P_2 = \frac{4}{27} C \qquad (10)$$

If we suppose that the slip at the rating load is 0.03, we can get from the Equations 2 and 9, $$P_1 = \frac{P_2}{S} = \frac{1}{S} \cdot C \cdot S \cdot (1-S)^2 = C(1-S)^2$$

Therefore, $$C = \frac{P_1}{(0.97)^2} \qquad (11)$$

Substituting (11) in the Equation 10 gives $$P_2 = 0.158 P_1 \doteqdot \frac{1}{7} P_1 \qquad (12)$$

The result of the Equation 12 shows that the required capacities of the auxiliary direct current machine and the rectifiers in FIG. 1 is ⅐ of the capacity of the main induction motor.

Now, we consider the efficiency of the system in FIG. 1. The largest loss of this system is that of the main induction motor, and the largest loss of the main induction motor is the copper loss. Speaking roughly, the order of the value of the copper loss is 4 or 5 times that of the iron loss at the rating load of the main induction motor, and the value of the mechanical loss is much lower than that of the iron loss.

Considering the facts stated above, this system is very convenient for getting the higher efficiency because the voltage applied on the primary terminals of the main induction motor is constant. Secondarily, we consider the efficiency of the transformer inserted in the secondary circuit of the main induction motor. Generally the transformer is designed so that the iron loss becomes equal to the copper loss at the rating load, because such transformer has the maximum efficiency at the rated current. Therefore, thinking from the point of view of the efficiency, that the iron loss in the transformer is reduced. So it is useful for raising the efficiency that the transformer is inserted in the secondary circuit, not in the primary circuit of the main induction motor. Because, as the speed of the motor approaches the synchronous speed, the frequency of the current in transformer 6 in FIG. 1 is reduced, and the value of the hysteresis loss is in proportion to the frequency of the voltage, and the value of the eddy current loss is in proportion to a square of the frequency.

As we have considered generally the efficiency of this method, we can get high efficiency of the system, in the circuit of FIG. 1.

Now, as we understand, the starting torque of the main induction motor becomes rather large, by inserting resistors or condensers in the secondary circuit of the main induction motor. Therefore, when my invention is used, we can also say that the resistors or condensers may be inserted electrically in parallel with the variable voltage ratio transformer 6.

Figure 3:
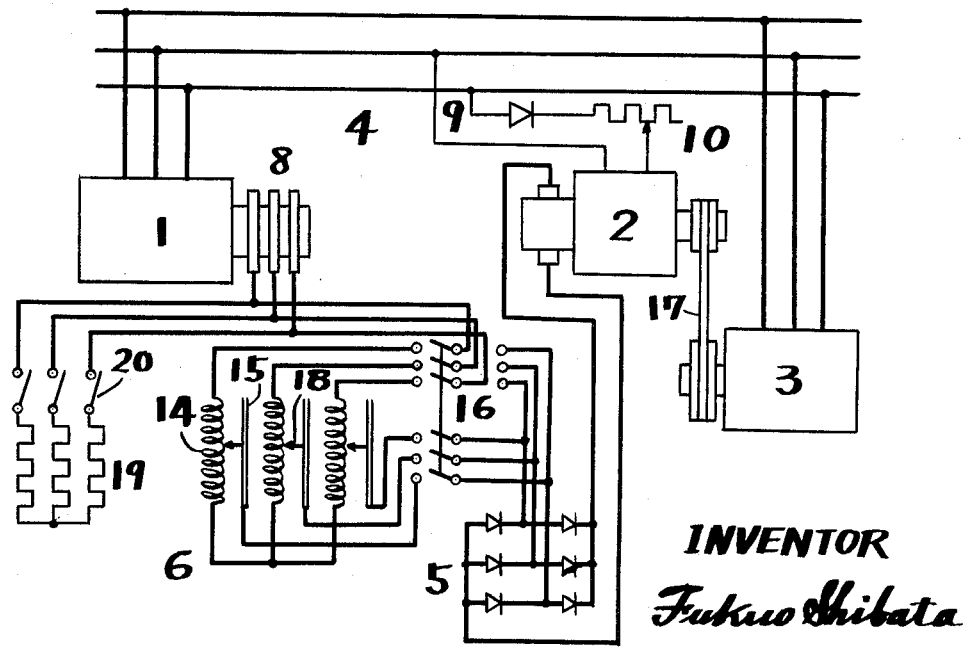
FIG. 3 illustrates diagrammatically still another embodiment of my invention.

In FIG. 3, the starting resistor 19 and its switching gear 20 are shown. When such starting resistor is provided, the electric power from the secondary windings of the induction motor is absorbed not only in the auxiliary direct current machine but also in the starting resistor during its starting period, therefore the starting torque of the motor system becomes very large.

Figure 2:
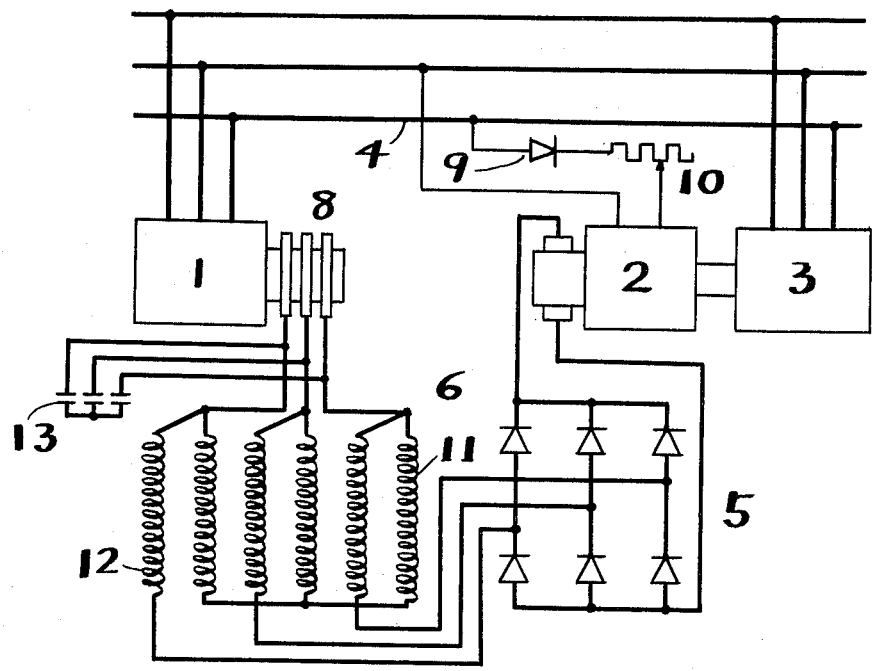
FIG. 2 illustrates diagrammatically another embodiment of my invention.

In FIG. 2, the condenser 13 is connected in parallel to the transformer or the induction regulator 6. When the condenser is connected in parallel to the transformer in the secondary circuit of the wound rotor induction motor in such a manner, the power factor of the motor circuit is improved, therefore the starting torque increases.

Furthermore, semiconductor rectifiers are protected by such starting resistors or condensers from a transient peak voltage, which is absorbed in the resistors or condensers. In FIG. 3, a change over switch 16 for transformer 6 is shown. When the transformer 6 is taken out from the circuit by the change over switch 16 in case of the control over the high speed range, the control system efficiency can be increased.

In FIG. 3, the rotor of the auxiliary direct current machine 2 is coupled to that of the synchronous or induction generator 3 with a belt 17. Thus the rotor of the auxiliary direct current machine 2 can be coupled to that of the synchronous or induction generator 3 by a belt, a chain, a gear and so forth. The advantage of the system in which these rotors are coupled with these devices is that the capacity of the direct current machine can be further reduced.

One of the special features of my invention, being understood from the above detailed explanation made hitherto, is to provide a variable voltage ratio transformer in the output circuit of the secondary windings of the main induction motor. As for the variable voltage ratio transformer, it is also provided in the circuit of the prior and original Kraemer or Scherbius method. Nevertheless, there is a distinct difference between the transformer of my invention and that of the prior and original Kraemer or Scherbius method.

In some prior arrangement of Kraemer method, only the current for the stator excitation flows in the variable voltage ratio transformer which acts as only the adjuster of the excitation. Even if we can adjust the excitation by the transformer, we cannot make the voltage difference or adjust the voltage ratio between the output terminals of the secondary windings of the main induction motor and the input terminals of the auxiliary machine. Also in some prior arrangement of Scherbius method, we can adjust only the current ratio between the stator windings and the rotor windings by the current transformer. But, we can neither make the voltage difference nor adjust the current and voltage ratio between the output terminals of the secondary windings of the main induction motor and the input terminals of the auxiliary machine.

Therefore, we cannot adjust widely the output terminal voltage of the secondary windings of the main induction motor by the small capacity of the auxiliary machine, in the arrangement of prior Kraemer or Scherbius method. But, in the arrangement of my invention, the voltage ratio or the current ratio between the output terminals of the secondary windings of the main induction motor and input terminals of the auxiliary direct current machine can be adjusted by the variable voltage ratio transformer inserted in the secondary windings of the main induction motor. Therefore, we can adjust widely the output terminals voltage of the secondary windings of the main induction motor by the small capacity of the auxiliary motor, in the arrangement of my invention.

An important point in my invention is that the arrangement is constructed by the combination of (a) a wound rotor induction motor, (b) a variable voltage ratio transformer connected in the secondary circuit of the above induction motor, (c) semiconductor rectifiers and (d) a direct current machine whose armature circuit is connected to the above transformer through the above rectifiers, and whose rotor is arranged to be coupled with that of a synchronous or induction generator. In other words, the excellent features of the operation or the effect attained by the combination of the above four machines and apparatus cannot be attained by any other arrangement of the prior method. The following is the explanation of the features of the operation attained by the above combination.

Figure 4:
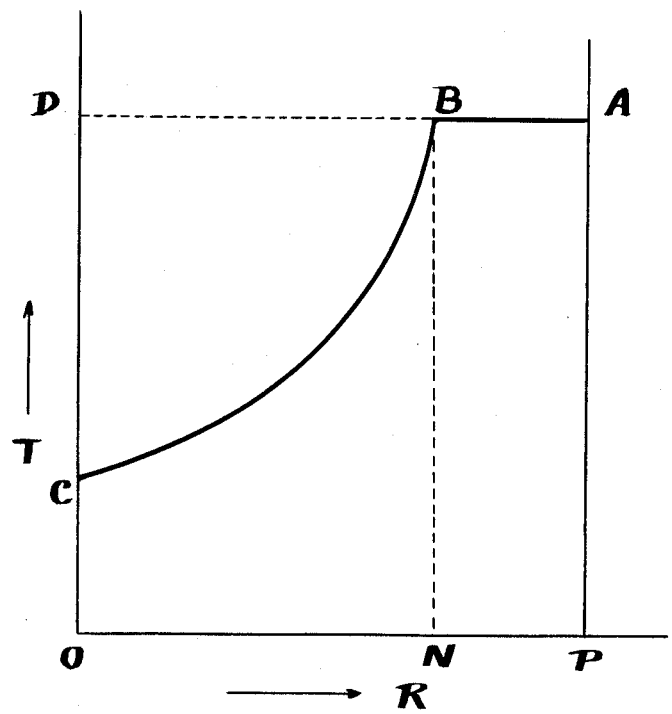
FIG. 4 represents speed-torque characteristics of the arrangement shown in FIG. 1.

(1) FIG. 4 is a torque-speed characteristic attained by the arrangement of FIG. 1. Curves ABC of FIG. 4 represent the torque-speed characteristics of the induction motor 1 shown in FIG. 1 obtained by utilizing respectively the field control and the transformer ratio control, at full load current conditions. It will be noted that the speed control of the arrangement may be extended by employing the transformer ratio control.

Curve AB of FIG. 4 represents the characteristic of the maximum torque vs. speed of the induction motor of FIG. 1 in case of controlling the field excitation of the direct current machine 2 and keeping the voltage ratio of the transformer constant. Curve BC of FIG. 4 represents the characteristic of the maximum torque vs. speed of the induction motor of FIG. 1 in case of controlling the voltage ratio of the transformer and keeping the field excitation of the direct current machine constant.

There has been a prior method in which a variable ration transformer is inserted in the secondary circuit of the wound rotor induction motor. However, because the secondary circuit of the variable ratio transformer is connected only to the field exciting circuit, not to the armature circuit in the prior method, the characteristic curve obtained by the prior method is only AB in FIG. 4, and the characteristic Curve BC cannot be obtained by the prior method.

(2) Semiconductor rectifiers such as selenium rectifiers, silicon rectifiers etc. are used in my invention. As the internal voltage drop of semiconductor rectifiers is very small compared with other rectifiers, almost constant speed characteristic can be obtained irrespectively of the load current, and the efficiency of the whole system becames very high compared with that of the system using other rectifiers.

However, semiconductor rectifiers are weak in transient peak voltages. When the primary circuit of the wound rotor induction motor is opened or closed, a transient peak voltage which is 2–10 times the normal circuit voltage may be induced in the semiconductor rectifier circuit, if there is no variable voltage ratio transformer. In the arrangement including a variable voltage ration transformer in common with semiconductor rectifiers, the transient peak voltage of the semiconductor rectifier circuit can be reduced by keeping the transforming ratio at a very high value during the transient time.

It can be said from the above effect, that there is an excellent merit in the combination of a variable voltage ratio transformer and semiconductor rectifiers.

(3) In a prior method described before using a variable voltage ratio transformer in the secondary circuit of the wound rotor induction motor, such non-step characteristics as shown in ABC curves of FIG. 4 cannot be obtained, because constant potential devices, for instance, storage batteries are used as a device connected to the secondary circuit of the transformer.

According to the arrangement of my invention, the speed control over the wide range can be obtained nonstepwise, not only in the high speed range of the induction motor but also in the low speed range. Therefore, the rangement of my invention can be easily used in the automatic control system.

One of the special features of my invention is to provide an induction regulator in the output circuit of the output terminals of the secondary windings of the main induction motor. In FIG. 2, the variable voltage ratio transformer 6 is an induction regulator which consist of primary windings 11 and secondary windings 12. In this case, the primary windings 11 are rotating ones and the secondary windings 12 are stationary ones.

There are various merits in the arrangement using an induction regulator in my invention, as follows.

(A) If the ordinary tapped transformer is used instead of the induction regulator in the arrangement of FIG. 2, and the induction motor is required to be controlled over a wide speed range, a number of electric contactors must be used. As there are no such contactors in the arrangement using an induction regulator, the arrangement can be economical.

(B) If speed variations are frequently repeated in such an arrangement having a tapping transformer and electric contactors, closing and opening of electric contactors must be repeated frequently, and the contactors are exposed to danger of damage. But, in my invention including an induction regulator, it is not necessary to install a contactor or to provide a contact point. Therefore, even if speed variations are frequently repeated in the arrangement of my invention using an induction regulator, it is not necessary to consider the trouble of contactors or contact points.

(C) In the arrangement having the tapped transformer, the induction motor can be controlled only stepwise, and cannot be controlled nonstepwise in its low speed range. But in the arrangement of my invention using an induction regulator, the induction motor can be controlled nonstepwise over the wide speed range including its low speed range.

(D) When an induction regulator is used in common with semiconductor rectifiers in the secondary circuit of the wound rotor induction motor, there is no danger for the semiconductor rectifiers, because there is no necessity to have switching device in an induction regulator, therefore there is no damage to induce a transient peak voltage.

As described before, a variable voltage ratio autotransformer can be used in my invention. According to my invention using a variable ratio autotransformer, the following advantage can be obtained.

When the voltage ratings and the current ratings are respectively the same in the above ordinary transformer and the autotransformer, the copper weight of the autotransformer is $(1-1/u)$ times that of the ordinary transformer, where $u$ is voltage ratio, therefore the nearer to 1 is the value of $u$, the less is the necessary weight of copper. As the transformer in my invention can be used in the range in which transforming ratio $w_1/w_2 = u$ is near to 1, where $w_1$ and $w_2$ are respectively primary and secondary winding turns, for instance $w_1/w_2 = 0.5$–$2.0$, the copper volume of the autotransformer can be considerably reduced and the economical compared with that of the ordinary transformer.

As a single winding is used per phase in an autotransformer, the construction is very simple, therefore the sliding contact type variable transformer whose voltage ratio can be controlled by contacts sliding on the windings can be obtained easily, if the autotransformer is used. Thus it can be said that the wound rotor induction motor can be controlled non-stepwise by using an autotransformer with ease, because an autotransformer can be constructed as a sliding contact type variable transformer.

The variable ratio transformer 6 in FIG. 3 is the transformer which consists of windings 14 and sliding contacts 18.

When the sliding contact type autotransformer is used in common with semiconductor rectifiers, the semiconductor rectifiers can be protected from the transient peak voltage. Because, as the current circuit can be opened and closed smoothly and successively by sliding the contacts on windings, there is no danger to induce a transient peak voltage in the semiconductor rectifier circuit.

Finally, I will explain the difference between the transformer of my invention and that of the prior Kraemer method. The transformer of the prior Kraemer method is inserted also in the circuit between the output of the secondary windings of the main induction motor and the input terminals of the auxiliary direct current machine. But the voltage ratio of the transformer in the arrangement of the prior method is constant, and is not variable.

Therefore, we cannot adjust the voltage ratio of the transformer in the arrangement of the prior method. As we cannot control the speed of the main induction motor by the transformer in the arrangement of the prior method, it is necessary to provide electric valves having control members, phase shifter, batteries for impressing negative biasing on grids and so forth, if we want to control a wide range of the speed of the main induction motor by an auxiliary direct current machine of capacity small compared with that of the main induction motor. So, the arrangement of the prior method having a constant voltage ratio transformer becomes very complicated and unreliable. On the contrary, the arrangement of my invention using a variable voltage ratio transformer is very simple and reliable compared with the arrangement of the prior method.

Further, in the arrangement of the prior method having a constant voltage ratio transformer, the speed of the main induction motor cannot be controlled by keeping the field excitation of the auxiliary direct current machine constant at its maximum rating, in the high speed range of the main induction motor. In the arrangement of the prior method, the field excitation of the auxiliary direct current machine must be changed, in the speed control of the high speed range of the main induction motor. But the speed of the main induction motor of my invention can be controlled in all speed ranges, including the high speed range of the main induction motor, only by controlling the transforming ratio, and keeping the shunt field excitation of the auxiliary direct current machine constant at its maximum rating. Therefore, the controlling device of my invention becomes more simple than that of the prior method having a constant voltage ratio transformer. Of course, the speed of the main induction motor of my invention can be controlled also by the field excitation control of the auxiliary direct current machine.

Still further, the rating of the rectifier in the arrangement of the prior method having a constant voltage ratio transformer must approximately be equal to that of the main induction motor. The reason why such a rating of the rectifier is needed in the arrangement of the prior method is because the main induction motor cannot be controlled by varying the voltage ratio of the transformer of the prior method. On the contrary, the rating of the rectifier of my invention may approximately be equal to that of the auxiliary direct current machine. The reason why such a rating of the rectifier may be used in the arrangement of my invention is because the main induction motor can be controlled by varying the voltage ratio of the transformer. The above fact is one of the important advantages of my invention which cannot be obtained by the arrangement of the prior method.

In this manner, there are great differences between the arrangement of my invention and the arrangements of prior methods without the variable voltage ratio transformer. I have explained my invention in which the number of the main induction motor and the auxiliary motor is singular, but of course, the substance of my invention does not change even if the number of the main induction motor and the auxiliary direct current machine etc. becomes plural. When these motors are used in some cases, for instance in electric cars, it is convenient to use these plural motors. Although I claim as shown in the following claims that the number of the main induction motor and the auxiliary direct current machine etc. is singular because of the simplicity of its expression, the range of my claim includes also the case in which the number of the main and the auxiliary direct current machine is plural. Hence, what I claim is:

1. In a speed control circuit for an induction motor having a primary winding supplied from an alternating current source and a wound secondary winding, in combination;
   a variable voltage ratio transformer in the output circuit of the secondary winding of said induction motor;
   semiconductor rectifiers for converting an alternating current output taken from said variable voltage ratio transformer to direct current;
   an auxiliary direct current machine having an armature circuit supplied by the direct current output of said semiconductor rectifiers;
   a generator whose rotor is mechanically coupled to the rotor of said auxiliary direct current machine operating with a predetermined speed and whose terminals are connected to said alternating current source; whereby said variable voltage ratio transformer adjusts the voltage ratio and current ratio between the output terminals of the secondary windings of said induction motor and the input terminals of said auxiliary direct current machine.

2. In a speed control circuit for an induction motor having a primary winding supplied from an alternating current source and a wound secondary winding, in combination;
   a variable voltage ratio transformer in the output circuit of the secondary winding of said induction motor;
   semiconductor rectifiers for converting an alternating current output taken from said variable voltage ratio transformer to direct current;
   an auxiliary direct current machine having an armature circuit supplied by the direct current output of said semiconductor rectifiers;
   a synchronous generator whose rotor is mechanically coupled to the rotor of said auxiliary direct current machine operating with a predetermined speed ratio, and whose terminals are connected to said alternating current source; whereby said variable voltage ratio transformer adjusts the voltage ratio and current ratio between the output terminals of the secondary windings of said induction motor and the input terminals of said auxiliary direct current machine.

3. In a speed control circuit for an induction motor having a primary winding supplied from an alternating current source and a wound secondary winding, in combination;

a variable voltage ratio transformer in the output circuit of the secondary winding of said induction motor;

semiconductor rectifiers for converting an alternating current output taken from said variable voltage ratio transformer to direct current;

an auxiliary direct current machine having an armature circuit supplied by the direct current output of said semiconductor rectifiers;

an induction generator whose rotor is mechanically coupled to the rotor of said auxiliary direct current machine operating with a predetermined speed ratio, and whose terminals are connected to said alternating current source; whereby said variable voltage ratio transformer adjusts the voltage ratio and current ratio between the output terminals of the secondary windings of said induction motor and the input terminals of said auxiliary direct current machine.

4. In a speed control circuit for an induction motor having a primary winding supplied from an alternating current source and a wound secondary winding, in combination;

a variable voltage ratio transformer in the output circuit of the secondary winding of said induction motor;

semiconductor rectifiers for converting an alternating current output taken from said variable voltage ratio transformer to direct current;

an auxiliary direct current machine having an armature circuit supplied by the direct current output of said semiconductor rectifiers;

a generator whose rotor is mechanically coupled to the rotor of said auxiliary direct current machine operating with a predetermined speed ratio, and whose terminals are connected to said alternating current source;

starting resistors which are inserted electrically in the output circuit of the secondary winding of said induction motor, and electrically connected in parallel with the above transformer; whereby said variable voltage ratio transformer adjusts the voltage ratio and current ratio between the output terminals of the secondary windings of said induction motor and the input terminals of said auxiliary direct current machine.

5. In a speed control circuit for an induction motor having a primary winding supplied from an alternating current source and a wound secondary winding, in combination;

a variable voltage ratio transformer in the output circuit of the secondary winding of said induction motor;

semiconductor rectifiers for converting an alternating current output taken from said variable voltage ratio transformer to direct current;

an auxiliary direct current machine having an armature circuit supplied by direct current output of said semiconductor rectifiers;

a generator whose rotor is mechanically coupled to the rotor of said auxiliary direct current machine operating with a predetermined speed ratio, and whose terminals are connected to said alternating current source;

phase shift condensers which are inserted electrically in the output circuit of the secondary winding of said induction motor, and electrically connected in parallel with the above transformer; whereby said variable voltage ratio transformer adjusts the voltage ratio and current ratio between the output terminals of the secondary windings of said induction motor and the input terminals of said auxiliary direct current machine.

6. In a speed control circuit for an induction motor a primary winding supplied from an alternating current source and a wound secondary winding, in combination;

a variable voltage ratio transformer in the output circuit of the secondary winding of said induction motor;

semiconductor rectifiers for converting an alternating current output taken from said variable voltage ratio transformer to direct current;

an auxiliary direct current machine having an armature circuit supplied by the direct current output of said semiconductor rectifiers;

a generator whose rotor is mechanically coupled to the rotor of said auxiliary direct current machine operating with a predetermined speed ratio, and whose terminals are connected to said alternating current source;

a change over switch which can be turned over to insert or take out the above transformer of the secondary circuit of the main induction motor; whereby said variable voltage ratio transformer adjusts the voltage ratio and current ratio between the output terminals of the secondary windings of said induction motor and the input terminals of said direct current machine.

7. In a speed control circuit for an induction motor having a primary winding supplied from an alternating current source and a wound secondary winding, in combination;

a variable voltage ratio autotransformer in the output circuit of the secondary winding of said induction motor;

semiconductor rectifiers for converting an alternating current output taken from said variable voltage ratio autotransformer to direct current;

an auxiliary direct current machine having an armature circuit supplied by the direct current output of said semiconductor rectifiers;

a generator whose rotor is mechanically coupled to the rotor of said auxiliary direct current machine operating with a predetermined speed ratio, and whose terminals are connected to said alternating current source; whereby said variable voltage ratio autotransformer adjusts the voltage ratio and current ratio between the output terminals of the secondary windings of said induction motor and the input terminals of said auxiliary direct current machine.

8. In a speed control circuit for an induction motor having a primary winding supplied from an alternating current source and a wound secondary winding, in combination;

an induction regulator in the output circuit of the secondary winding of said induction motor;

semiconductor rectifiers for converting an alternating current output taken from said induction regulator to direct current, an auxiliary direct current machine having an armature circuit supplied by the direct current output of said semiconductor rectifiers;

a generator whose rotor is mechanically coupled to the rotor of said auxiliary direct current machine operating with a predetermined speed ratio, and whose terminals are connected to said alternating current source; whereby said induction regulator adjusts the voltage ratio and current ratio between the output terminals of the secondary windings of said induction motor and the input terminals of said auxiliary direct current machine.

9. In a speed control circuit for an induction motor having a primary winding supplied from an alternating current source and a wound secondary winding, in combination;

a variable voltage ratio transformer having many winding taps in the output circuit of the secondary winding of said induction motor;

semiconductor rectifiers for converting an alternating current output taken from said variable voltage ratio transformer to direct current;

an auxiliary direct current machine having an armature circuit supplied by the direct current output of said semiconductor rectifiers;

a generator whoes rotor is mechanically coupled to the rotor of said auxiliary direct current machine operating with a predetermined speed ratio, and whose terminals are connected to said alternating current source; whereby said variable voltage ratio transformer adjusts the voltage ratio and current ratio between the output terminals of the secondary windings of said induction motor and the input terminals of said auxiliary direct current machine.

References Cited by the Examiner

UNITED STATES PATENTS

| 1,374,559 | 4/1921 | Fortescue | 318—237 |
| 1,542,483 | 6/1925 | Stephenson | 318—355 |

FOREIGN PATENTS

| 676,431 | 6/1929 | France. |

ORIS L. RADER, *Primary Examiner.*

JOHN F. COUCH, MILTON O. HISHFIELD,

*Examiners.*